United States Patent [19]

Bini

[11] Patent Number: 4,639,030
[45] Date of Patent: Jan. 27, 1987

[54] PROCESS AND APPARATUS FOR THE LIFTING AND CARRIAGE OF OBJECTS PLACED ON TRAY-LIKE SUPPORTS

[76] Inventor: Anselmo Bini, 1, Via Sabatini, Chiesa Nuova di Monte San Pietro, Italy, 20050

[21] Appl. No.: 735,873

[22] Filed: May 20, 1985

[30] Foreign Application Priority Data

May 22, 1984 [IT] Italy ................................ 21031 A/84

[51] Int. Cl.[4] .......................... B65G 57/04; B66C 1/02
[52] U.S. Cl. .................................. 294/64.1; 294/87.12
[58] Field of Search ................... 294/2, 64.1, 65, 87.1, 294/87.12; 53/247, 537, 540, 541; 248/362, 363; 269/21; 414/72, 121, 627, 737, 744 B, 752

[56] References Cited

U.S. PATENT DOCUMENTS

| | | | |
|---|---|---|---|
| 2,880,030 | 3/1959 | Horn | 294/65 |
| 2,920,916 | 1/1960 | Pagdin | 294/64.1 |
| 3,313,568 | 4/1967 | Fogg | 294/64.1 |
| 3,387,718 | 6/1968 | Roth et al. | 414/121 |
| 3,404,787 | 10/1968 | Hayford | 294/64.1 X |
| 3,465,495 | 9/1969 | Zwiacher et al. | 294/64.1 X |
| 4,045,073 | 8/1977 | Mosterd | 294/65 X |
| 4,355,936 | 10/1982 | Thomas et al. | 294/65 X |

*Primary Examiner*—Johnny D. Cherry
*Attorney, Agent, or Firm*—Lerner, David, Littenberg, Krumholz & Mentlik

[57] ABSTRACT

The invention concerns a process and an apparatus for the lifting and carriage of objects placed on tray-like supports, in particular for the lifting and carriage of fruits such as apples, oranges or the like, placed on spacing and positioning trays, in order to put the trays into box-shaped containers. The process and the apparatus are characterized in that they comprise a suction hood with movable edges which is positioned on top of each tray support and put in depression to generate a sucking effect with the cooperation of the support which closes at the bottom the suction hood itself. The objects placed on the tray, during the introduction of the suction hood on top of the latter, cause a previous movement of the movable edges of the hood as far as to bring them into contact with the sides of the tray support. During suction the support is deformed towards the inside of the suction hood to allow its introduction, together with the movable edges of the hood, into a box-shaped container, the size and shape of which are equal to the size and shape of the tray.

15 Claims, 7 Drawing Figures

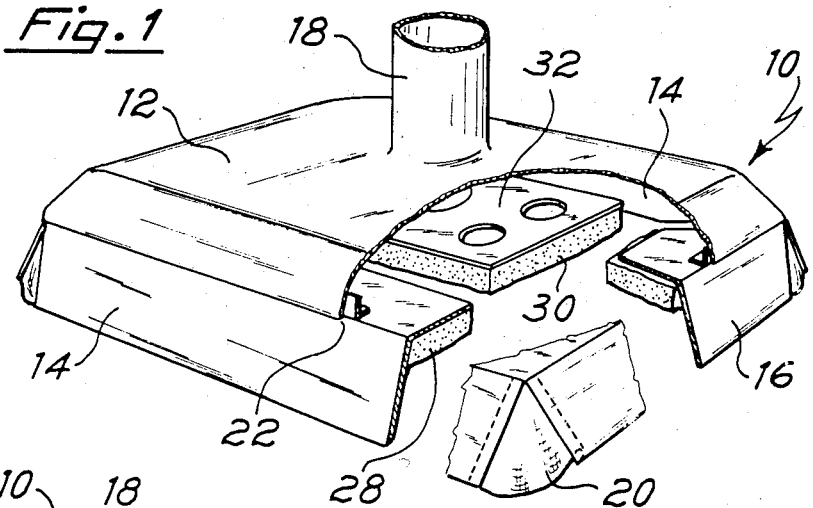
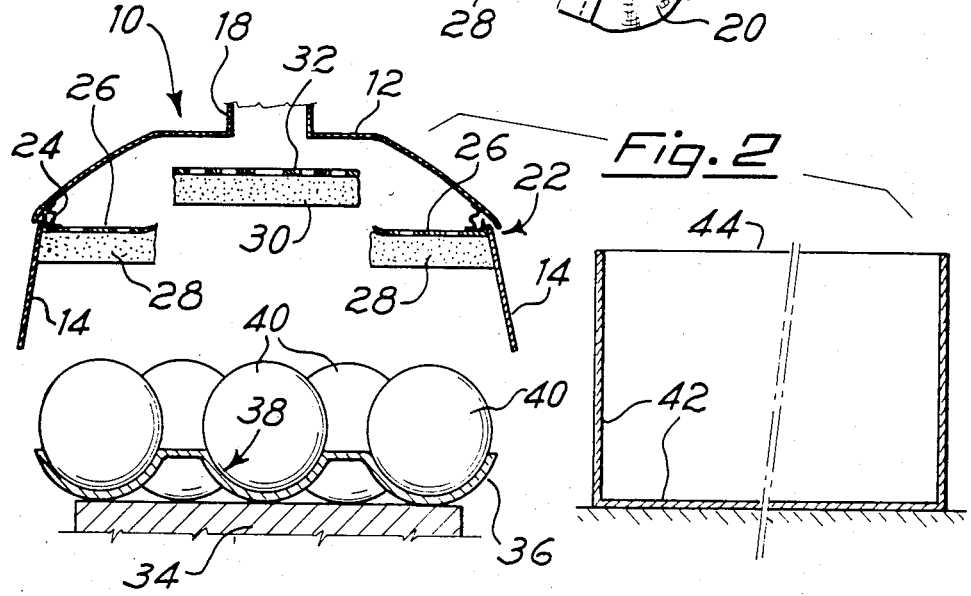
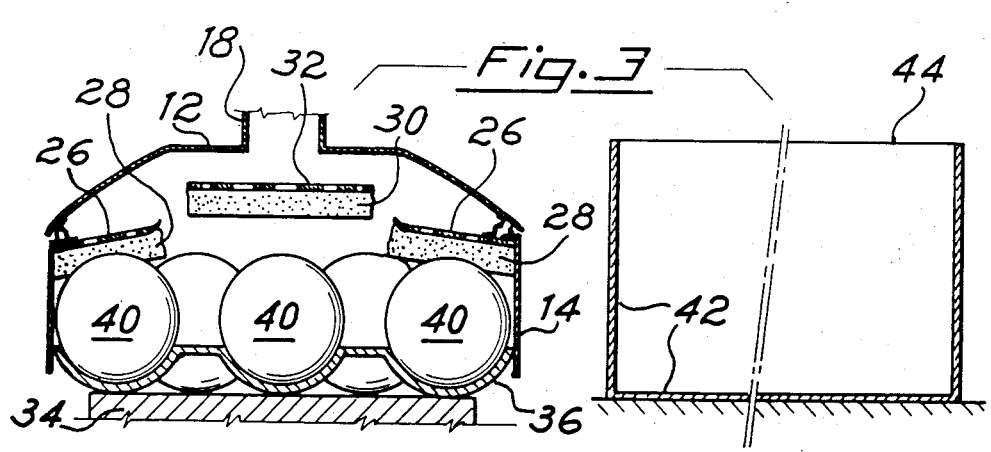

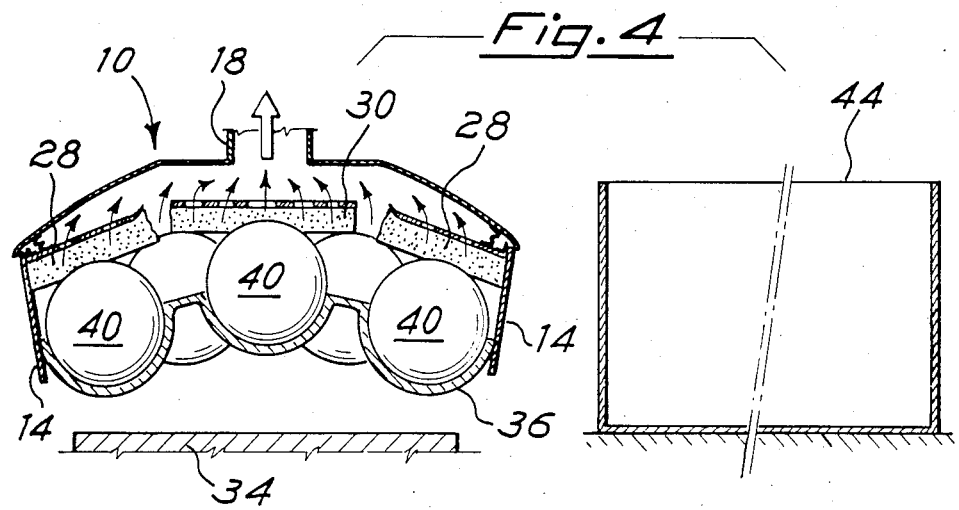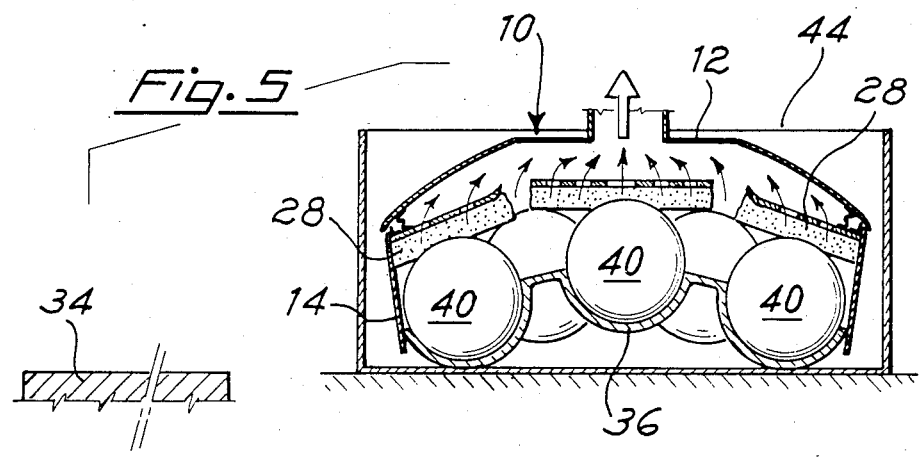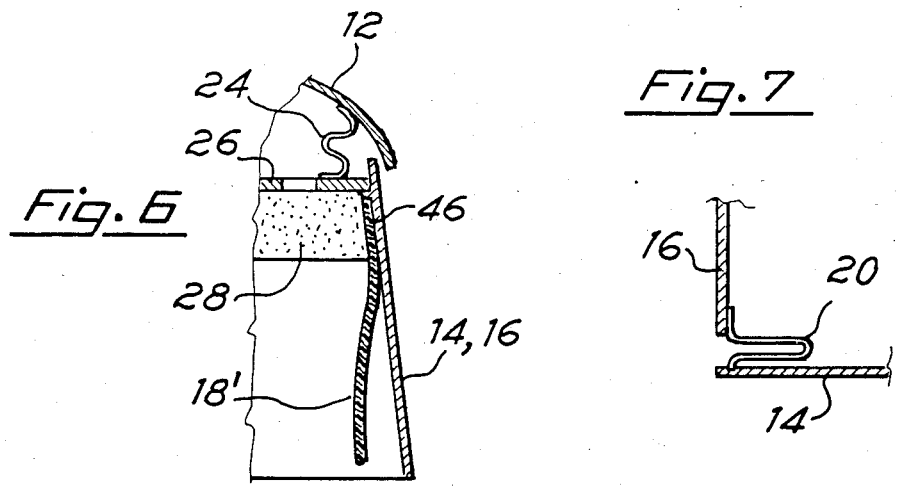

PROCESS AND APPARATUS FOR THE LIFTING AND CARRIAGE OF OBJECTS PLACED ON TRAY-LIKE SUPPORTS

BACKGROUND OF THE INVENTION

FIELD OF THE INVENTION

The present invention concerns a process and an apparatus for the lifting and carriage of objects placed on traylike supports and more particular, even if not exclusively, it concerns a process and an apparatus for the lifting and the carriage of objects constituted by fruits such as apples, oranges or others, or objects having essentially similar shape, placed on tray supports, in which in particular the objects can have a pre-arranged position, in way that each tray support loaded with the present number of objects is lifted and inserted into a box-shaped container open in the upper section, for the packaging of said objects.

We already know the technique of packaging objects, in particular fruits of relatively large size and relatively regular shape, placing them tidily into containers made of cardboard, wood, plastic or the like, which are open in their upper section to allow the loading of the objects and then can be closed by a lid to obtain a package ready for storage and carriage. Inside each container the objects or fruits are arranged in subsequent layers, each separated from the underlying one by means of a tray which holds the objects or fruits, for instance, in predetermined seats provided in the tray itself. Said trays are generally very thin and made of a very scarcely resistant material, such as polystyrene, wood pulp, chemical pulp, paper or similar, and are preferably arranged inside the container in a way that hollow and full spaces alternate in the subsequent layers for better utilization of the space.

The problem which the present invention proposes to solve is the lifting of said very scarcely resistant, easily breakable and often also very flexible trays already bearing the relatively heavy objects or fruits in the seats provided in the same, and their introduction into the box-shaped container, keeping carefully in mind that often the shape and the size of the tray-like supports are equal to the shapes and size of the internal section of the containers, in order to avoid undesirable shiftings of the trays and therefore of the objects or fruits inside the containers during the handling of same.

Up to now this loading operation has practically been performed manually with the help of particularly skilled operators, in that the question is to rapidly move the trays loaded with fruits or objects from a feed area as far as the inside of a box-shaped container, without causing breakings or bendings of the trays, which would cause losses of the objects or fruits, and therefore with a relatively high speed, but also controlling said speed in order to avoid that the objects or fruits come out from the seats provided in the trays and therefore may be lost or somewhat damaged. Furthermore it is necessary that each tray is put into the container with a certain care in order to avoid to damage the objects or fruits already present in the container itself.

A device for lifting and carrying single objects or fruits by means of feeding suckers, each operating on a single object or fruit, is already known. In particular, this system is used for the loading of the aforementioned trays. On the contrary the system cannot be used for the lifting and the carriage of the already filled trays into the boxes or the packing containers in that, as already mentioned, the trays are put in alternate positions, layer after layer, and therefore a rotation by 180 of the whole plant would be necessary. Furthermore, in this way, means for the lifting of the trays are not foreseen and finally there is always the problem that said sucking devices cannot lift a particular object or fruit due to the configuration of the same, inconvenience which is manually avoidable when trays have to be filled, but not equally avoidable when packaging boxes with full trays have to be loaded.

SUMMARY OF THE INVENTION

Therefore, a main object of the present invention is to propose a new process and a new apparatus for the lifting and the carriage of objects placed on tray-like supports, in particular even if not exclusively fruits arranged on fragile and flexible trays which must be put into boxes or packaging containers, which allow to perform said operations with the maximum reliability and safety, using an apparatus having particularly simple and economical structure, capable of handling with the utmost care both the objects and the tray supports on which the same are placed.

According to the invention, the above is achieved by means of a process essentially comprising the steps of: placing a sucking hood with movable edges above each tray support; putting in depression the sucking hood forming a sucking effect on the support which closes the lower section of the hood itself; lifting and moving the hood together with the support and the objects arranged on the same as far as a release position; and removing the depression in the hood. In particular in the case of use of fragile and/or flexible tray supports, the deformations of the support during the sucking stage are limited by means of contrasts inside the suction hood and acting, during the sucking stage, on the objects and/or the support.

Moreover, to perform the aforesaid process, the invention proposes an apparatus for lifting and carrying objects arranged on a tray-like supports or similar, which essentially comprises: a suction hood with movable edges placed above the tray support, with its movable edges adjacent to the support sides; means to put in depression the inside of the suction hood, blocking the movable edges on the support sides; a device for lifting and carrying the suction hood and the support from a start position to a final position; and means to remove depression inside the suction hood.

These and other particularities and characteristics of the invention will be now described more in detail with reference to a preferred embodiment of same, schematically illustrated in the accompanying drawings where:

BRIEF DESCRIPTION OF THE DRAWINGS

FIG. 1 is a perspective view, with removed and simplified pieces, of a suction hood belonging to the apparatus according to the invention.

FIGS. 2 to 5 represent, in cross section according to a vertical plan, the different steps of the process for lifting and carrying a tray loaded with fruits from a support of same as far as the inside of a box-shaped packaging container by means of the hood of FIG. 1.

FIG. 6 is a cross sectional view according to a vertical plan illustrating a modifying embodiment of the edges of the suction hood.

FIG. 7 is a partial section according to a horizontal plan illustrating the connection between the edges of the suction hood.

DESCRIPTION OF THE PREFERRED EMBODIMENTS

The following description is made with particular reference to the loading, by means of trays provided with shaped seats, fragile and at least partly flexible, bearing fruits in said seats. The lifting and the carriage are performed in order to put said trays with the fruits into a box-shaped container, for instance made of cardboard, which has a section with shape and size equal to the shape and size of the trays. This situation is the most delicate and difficult situation which may be faced in the application of the present invention. However, it must be intended that the invention is also applicable to the handling of objects different from fruits, placed on otherwise shaped and possibly even stiff trays, said handling being possibly performed also for aims other than the packaging into box-shaped containers.

The above being stated, the apparatus for the application of the invention essentially comprises a suction hood 10, (FIG. 1), provided with a fixed section 12 and essentially movable edges 14 and 16. Preferably, the suction hood presents a rectangular configuration in plan and the movable edges 14 and 16 are placed according to the rectangle sides. In the center, the fixed section 12 of the suction plate presents a fitting 18 which is connected to a vacuum applying means or depression source 19 (FIG. 1) through which a certain depresssion can be created inside the hood, the value of which is adequately controlled by a vacuum limiting means or safety valve 21 placed for instance between the depression source and the fitting 18 which avoids that too high depression values are reached. Appropriate vacuum releasing means 23 are also provided for releasing the vacuum or depression within the hood to release items carried in the hood as described hereinbelow.

The movable edges 14 and 16 of the suction hood 10 can be made of a flexible material, but they preferably consist of stiff elements, as shown also in FIGS. 2 to 5, connected in correspondence to the edges by fittings 20 (FIGS. 1 and 7) made of flexible material, in particular rubber, which can be applied to the two adjacent edges 14 and 16 in the way illustrated in FIG. 7, so as to constantly assure pneumatic sealing when the edges 14 and 16 approach to each other in correspondence to their free ends. To allow said approaching, the edges 14 and 16 of the suction hood 10 are hinged, as indicated for example by the reference 22, to the fixed section 12 and are stressed by elastic elements 24 which tend to keep said movable edges in a predetermined position, such as the one shown in FIG. 2, in which the edges are slightly funnel-shaped towards outside.

As shown in particular in the figures, each edge 14 or 16 is formed by an arm of an element having L-shaped section articulated in the fixed section 12 of the suction hood in the point 22 of connection of the arms and provided with a second arm 26 which extends inside the suction hood in an essentially horizontal position when the hood is in its rest condition illustrated in FIG. 2.

The section of the arms 26 turned towards the outside is preferably covered with a layer made of soft material 28 designed to form a rest for the objects in particular fruits contained in the tray to be lifted and carried. Finally, also the inside of the hood is provided with a layer 30 made of sufficiently yielding material and forming a suitable contrast for the handled fruits, the layer 30 being assembled by a support 32 and adjustable positioning means 33 (FIG. 2) in the hood and obviously provided with holes for pneumatic connection with the suction fitting 18. Appropriate means, schematically indicated at 35 (FIG. 2) are provided for placing the hood above the tray support and engaging the movable side walls 14 of the hood with the edges of the support as further described hereinbelow. Appropriate means schematically indicated at 37 are provided for lifting and carrying the tray, and hence the items engaged with the tray, as also further described hereinbelow.

The apparatus for the lifting and the carriage according to the invention cooperates with a vertically movable support 34 (FIG. 2) which draws a tray support 36, from a conveying belt and pushed it into the hood, in this particular case said support consisting of a flexible tray made of polystyrene, wood pulp, chemical pulp, paper or other, having seats 38 in which fruits 40, for example apples, are arranged. The support 34 has such a configuration as to result, in plan, included between the tray 36 sides and, in any case, such as not to interfere with the action of the hood 10. The illustrated apparatus serves in particular to load boxes made of cardboard or other appropriate material 42 with a series of trays 36 bearing fruits 40, by introduction of the trays into the boxes through the upper opening 44 of same and their positioning on the bottom of the boxes or on the previously introduced layer. The trays and the boxes have corresponding shape and dimensions.

Using the previously described suction hood, a tray 36 already loaded with fruits 40 as indicated in FIG. 2 is introduced into the hood as far as the fruits 40 (FIG. 3) exercise a contrast action against the layer of material 28 applied on the arms 26 of the L-shaped elements, causing in this way an upward rotation of the arms 26 and a rotation towards the inside of the edges 14 of the suction hood, until they essentially come into contact with the sides of the tray 36, forming with the latter an essentially closed chamber. During this stage, the flexible section 20 which connects two adjacent edges 14 and 16 of the suction hood goes towards the inside, as indicated in FIG. 7, so as to assure continuity in sealing and closure of the chamber in said area.

In this situation, a depression in the suction hood is created as indicated in FIG. 4. It must be noticed that said depression is contained by means of a source capable of producing high suction values, but however with the help of a safety valve which controls the depresssion values inside the suction hood so that they are adequately limited. In fact, the abovesaid suction hood is designed to work in a reliable way even when possible local breakings of the trays may cause losses in depression inside the hood, losses which must be balanced by the high capacity of the system. On the other hand, should said losses not occur, it is on the contrary necessary to limit the degree of depression inside the hood in order not to damage the fruits 40 and/or the trays handled by the illustrated apparatus. In a practical embodiment, for example, a sucking apparatus has been used capable of producing a capacity ranging between 250–300 m$^3$/h with a head of 200 mmHg considerably reduced in the hood. As shown in FIG. 4, the sucking action causes a further displacement of the edges 14 and 16 of the hood in the direction of reciprocal approaching, making them pass from a funnel-position towards the outside (FIG. 2) to a funnel-position towards the inside (FIG. 4) with simultaneous partial deformation of the tray 36 which positions itself as shown in FIG. 4, with an arch-shaped configuration towards the inside of the suction hood. The deformation of the tray (or its displacement in case of stiff trays) is however limited by the contrast of the fruits 40 against the layers 28 and 30 which are arranged and possibly adjusted in a way as to avoid any excessive deformation of the tray, which may lead to damaging of the tray itself or of the products contained. At the same time a reduction of the encumbrance of the tray is obtained so that the latter can be introduced into the container 42 without problems in that the overall size of the tray and of the edges of the suction hood is slightly lower than that of the container 42.

This operation is illustrated in FIG. 5, which shows that the suction hood, together with the tray 36 and the fruits 40, is introduced into the box as far as the tray 36 rests on the bottom of same or on the previously packaged layer, therefore without damaging in any way the products and in particular the fruits 40. Once the insertion has been performed, the depression inside the suction hood is removed and the tray spreads again completely covering the inside of the container 42 and recovering its normal position, while the suction hood is pushed upwards and is ready again to repeat the operation. FIG. 6 illustrates a variant according to which the edges 14 and/or 16 of the suction hood are provided inside with a flexible element 18', for example made of rubber, fixed in its upper section, in reference 46, to the edges 14, 16 and freely protruding towards the inside, said element serving to assure adhesion on the sides of the tray 36 and therefore a more perfect sealing of the chamber when the suction hood is placed in depression.

I claim:

1. A method for lifting and carrying an assembly including objects disposed on a tray-like support, comprising: placing an open-bottomed suction hood with movable side walls above said support so that said objects are disposed within the hood; engaging said side walls with said support so that said support closes the bottom of said hood; applying a vacuum to the interior of the suction hood so that said tray-like support is urged upwardly toward the interior of the hood by atmospheric pressure; lifting and carrying the hood with the support and the objects as far as a release position; and releasing the vacuum within the hood, said objects being supported by said support during said lifting and carrying steps.

2. A method according to claim 1, characterized in that deformation of the support toward the interior of the hood under influence of said vacuum is limited by means of stops present inside the suction hood and engaging the assembly.

3. A method according to claim 1, characterized in that the support is partially deformed towards the inside of the hood and said side walls are displaced towards one another under the effect of vacuum to thereby temporarily constrict said support and in that the support and at least part of the hood are introduced into a box-shaped container having the same section as the normal, unconstricted plan of the support.

4. A method according to claim 1, characterized in that said side walls of said hood are pre-closed to engage the support before said vacuum is applied.

5. A method according to claim 4, wherein the step of pre-closure of the side walls of the hood is carried out by the mechanical action of the assembly on parts connected to the side walls of the suction hood, during placement of the hood above the support.

6. Apparatus for the lifting and carrying an assembly including objects arranged on a tray-like support, said apparatus comprising: a suction hood with an open bottom and movable side walls; means for placing the hood above the support and engaging said movable side walls with the edges of the support so that the support closes the bottom of the hood; means for applying a vacuum to the inside of the suction hood so that the support is urged toward the interior of the hood by atmospheric pressure; means for lifting and carrying the suction hood and the assembly from a start position to a final position while said vacuum is applied; and means for releasing the vacuum inside the suction hood when said support is in said final position.

7. Apparatus according to claim 6, characterized in that said vacuum-applying means is operative to apply a vacuum sufficient to cause deformation of said support toward the interior of said hood under the influence of atmospheric pressure, the apparatus further comprising stops disposed inside the suction hood for engaging the assembly so as to limit the deformation of the support toward the interior of the hood, said stops being adapted to permit some deformation of said support, whereby said support is deformed toward the interior of the hood when said vacuum is applied.

8. Apparatus according to claim 6, further comprising means for limiting the degree of vacuum inside the suction hood.

9. Apparatus according to claim 6, characterized in that the suction hood includes a central section, said side walls extend downwardly from said central section and said side walls are articulated for pivotal movement relative to said central section about horizontal axes between an insertion position and a holding position, said side walls pivoting inwardly, toward one another in movement from said insertion position to said holding position.

10. Apparatus according to claim 9, characterized in that the side walls are stiff, the apparatus further comprising flexible wall elements connecting said side walls to one another, said flexible wall elements being deformable to allow movement of said side walls between said insertion and holding positions.

11. Apparatus according to claim 10, characterized in that the stiff side walls bear on their inside faces appendixes made of flexible material, each such appendix being fixed to the the associated side wall adjacent said central section.

12. Apparatus according to claim 9 further comprising elastic elements interposed between the side walls and the central section, said elastic elements biasing said side walls toward said insertion position.

13. Apparatus according to claim 9, characterized in that each of said side walls has an arm extending into interior of the suction hood beneath said central section, said arms engaging the assembly during placement of the suction hood above the support to thereby force said side-walls toward said holding position and into engagement with said support.

14. Apparatus according to claim 13, characterized in that each of said arms has a layer of soft material facing downwardly, away from said central section for engaging the objects when said hood is placed above said support.

15. Apparatus according to claim 9, characterized in that said central section of the suction hood bears in adjustable position a layer of soft material for engaging the objects on the traylike support.

* * * * *